No. 790,482. PATENTED MAY 23, 1905.
E. DECLERCQ.
LIME SATURATER FOR WATER PURIFYING PLANTS.
APPLICATION FILED NOV. 5, 1903.
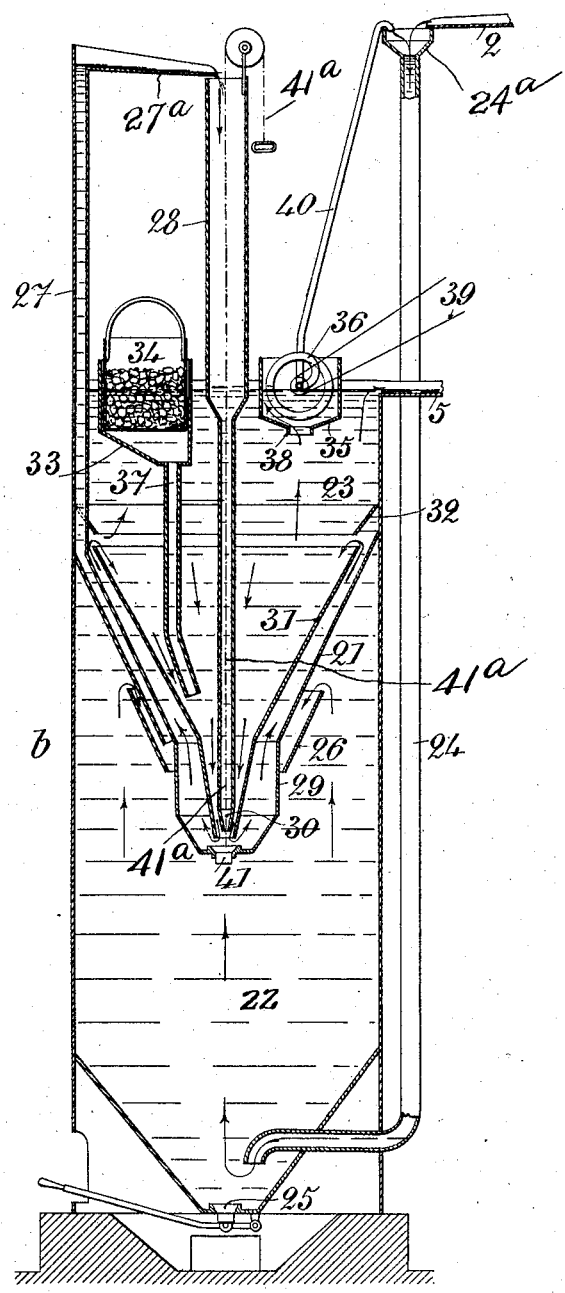

No. 790,482. Patented May 23, 1905.

UNITED STATES PATENT OFFICE.

ERNEST DECLERCQ, OF LILLE, FRANCE.

LIME-SATURATER FOR WATER-PURIFYING PLANTS.

SPECIFICATION forming part of Letters Patent No. 790,482, dated May 23, 1905.

Application filed November 5, 1903. Serial No. 179,982.

*To all whom it may concern:*

Be it known that I, ERNEST DECLERCQ, engineer, a citizen of the Republic of France, residing at 1$^{bis}$ Rue de la Chambre des Comptes à Lille, Département du Nord, in the Republic of France, have invented certain new and useful Improvements in Lime-Saturaters for Water-Purifying Plants, of which the following is a specification.

This invention relates to a device for saturating lime intended to be used in an apparatus or plant for purifying water by means of lime and soda.

One object of the invention is to provide a device of this character which will be simple in construction, durable in use, efficient in operation, and comparatively inexpensive to produce.

Another object of the invention is to dispense with the use of a mechanical stirrer, by means of which a quick and complete dissolution of the lime is effected, and I accomplish this by mixing with the foul or impure water before it is admitted into the device a quantity of lime-water, which is drawn from the device, and also by discharging the impure water into the residues of lime and lime-water remaining in the machine from a previous operation. In this manner I get rid of the carbonic acid, (free and bicarbonate acid,) and the water when it comes in contact with the bits of lime does not exercise any carbonating action, and thereby form a hard crust of carbonate of lime on the bits or particles of lime.

With the above and other objects in view the invention consists of certain novel features of construction, combination, and arrangement of parts, as will be hereinafter more fully described, and particularly pointed out in the appended claims.

The accompanying drawing shows a vertical sectional view through a lime-saturating device constructed in accordance with my invention.

Referring to the drawing more particularly, the letter $b$ denotes a recipient or receptacle which is substantially of cylindrical form and mounted upon a suitable base. The receptacle $b$ has a conical bottom in which is provided a sludge draw-off valve 25, and adjacent to the upper end of said receptacle is a conical partition 21, which separates the latter into lower and upper chambers 22 23. The partition 21 is formed with a cylindrical portion 29 and a valve 41, which is operated by means of a chain 41$^a$. The foul or impure water which is to be treated with lime is fed into the lower compartment 22 through a vertical pipe 24, which has at its upper end an enlarged portion or funnel 24$^a$. The water discharged through the pipe 24 into the lower chamber 22 passes up between the under side of the partition 21 and a conical check-ring 26, which surrounds and is spaced from said partition 21, and then into the lower end of a discharge-pipe 27, the upper end of which is formed with an inwardly-projecting spout 27$^a$. This spout 27$^a$ discharges into a centrally-disposed vertical tube 28, the lower reduced portion of which has its contracted conical end 30 disposed directly above the said valve 41. Surrounding the lower reduced portion of said tube 28 and spaced from it and from said partition 21 is a conical deflector 31. Secured to the side wall of the receptacle above the partition 21 and the deflector 31 is a conical check-ring 32. In the compartment 23 of the receptacle is disposed a vessel 33, into which lime is inserted by means of a basket 34, made of perforated or reticulated material. The bottom of the vessel 33 is provided with a discharge-tube 37, the lower open end of which discharges into the space between the lower end of the tube 28 and the deflector 31. The water as it is discharged from the contracted end of the tube 28 draws the water, together with the lime solution, from the vessel 33 down through the lower open end of the deflector 31, forcing it up between the deflector 31 and said partition 21, as indicated by the arrows in the figure of the drawing. The checking-ring 32, being disposed directly above the space between said deflector and said partition, prevents the heavy particles of lime from circulating in the upper portion of the chamber 33 and causes them to drop down upon the contracted bottom of the partition 21, as will be readily understood.

Disposed in the upper chamber 23 of the receptacle is a vessel 35, formed with an opening 38 in its bottom and containing an elevating device in the form of a helical tube 36, which when rotated by a belt 39 or any other suitable gearing will force the water charged with lime up through a pipe 40 and into the funnel 24ª at the upper end of the pipe 24.

The receptacle $b$ is provided at its top with an overflow outlet-spout 5.

The operation of the device is as follows: The foul or impure water is discharged into the upper end of the tube 24, together with the small quantity of lime-water which is elevated by the device 36 through the tube 40. From the pipe 24 this water is discharged into the bottom of the compartment 22 of the receptacle which contains the lime-water remaining from the previous operation of the device. From the compartment 22 the water is discharged up through the pipe 27 and into the pipe 28, which in turn directs it to the bottom of the upper compartment 23. The contracted end 30 of the pipe 28 acts as an injector, and as the water is discharged therefrom it causes the water above the deflector 31 and the lime-water from the tube 37 to pass downwardly and then upwardly between said deflector and the partition 21, as indicated by the arrows. This creates a circulation in the compartment 22, which causes the water to be thoroughly saturated with lime. It will be seen that in the chamber 22 is formed the first precipitation of carbonate of lime, which is facilitated by the alkaline state of the liquor, so that the water passing from the pipe 28 contains no free carbonic acid. The rapid formation of a crust of carbonate of lime on the grains of fresh lime is thus avoided, and as this formation interferes with the dissolution I am able to dispense with the mechanical stirrer, which is necessary in other devices of this character.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a plant for the purifying of water, a device for saturating with lime comprising a recipient, a conical partition dividing the said recipient into two superposed chambers, a valve in the bottom of the upper chamber, a pipe for feeding the foul water to the lower part of the lower chamber, a pipe connecting the top of the latter chamber with the bottom of the upper chamber, a recipient for the lime in the upper chamber, and an outflow-port at the top of the upper chamber.

2. In a plant for the purifying of water, a device for saturating with lime comprising a chamber having a conical bottom, a funnel-shaped partition in the said chamber, a feed-pipe for the water having at its lower end a narrow conical opening located in the narrow part of the funnel, a recipient for the lime, a discharge-pipe for the lime leading to the said funnel, and an inclined annular partition fixed against the wall of the chamber above the funnel.

3. In a plant for the purifying of water, a device for saturating with lime comprising two superposed chambers, a pipe for feeding the water to the lower part of the lower chamber, a pipe connecting the top of the lower chamber with the bottom of the upper chamber, a recipient for the lime in the upper chamber, an outflow-port at the top of the upper chamber, and means for forcing a part of the water from the upper chamber and into the first-named pipe.

In testimony that I claim the foregoing as my invention I have signed my name in presence of two subscribing witnesses.

ERNEST DECLERCQ.

Witnesses:
AUGUSTUS E. INGRAM,
MAURICE ROUX.